US009699509B2

United States Patent
Tago (10) Patent No.: US 9,699,509 B2
(45) Date of Patent: Jul. 4, 2017

(54) ALTERNATE VIDEO PROCESSING ON BACKUP VIRTUAL MACHINE DUE TO DETECTED ABNORMALITIES ON PRIMARY VIRTUAL MACHINE

(71) Applicant: OLYMPUS CORPORATION, Hachioji-shi, Tokyo (JP)

(72) Inventor: Hiroki Tago, Hanno (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/226,403

(22) Filed: Aug. 2, 2016

(65) Prior Publication Data

US 2016/0345057 A1 Nov. 24, 2016

Related U.S. Application Data

(63) Continuation of application No. PCT/JP2015/059629, filed on Mar. 27, 2015.

(30) Foreign Application Priority Data

Apr. 22, 2014 (JP) .................................. 2014-088621

(51) Int. Cl.
    H04N 21/44 (2011.01)
    H04N 21/443 (2011.01)
    (Continued)

(52) U.S. Cl.
    CPC ..... H04N 21/4437 (2013.01); G06F 9/45558 (2013.01); G06F 9/46 (2013.01);
    (Continued)

(58) Field of Classification Search
    CPC ......... H04N 21/4437; H04N 21/64723; H04N 21/442; H04N 21/6125; G06F 9/45558;
    (Continued)

(56) References Cited

U.S. PATENT DOCUMENTS 6,185,609 B1    2/2001  Rangarajan et al.
7,865,762 B2 *  1/2011  Swanson ............. G06F 11/0712
                                                    714/2

(Continued)

FOREIGN PATENT DOCUMENTS

JP    H09-288648 A    11/1997
JP    H11-219342 A     8/1999

(Continued)

OTHER PUBLICATIONS

Jun. 9, 2015 International Search Report issued in International Patent Application No. PCT/JP2015/059629.

(Continued)

Primary Examiner — Benjamin Wu
(74) Attorney, Agent, or Firm — Oliff PLC (57) ABSTRACT

A data processing system includes a first virtual machine, a second virtual machine, a switching unit, an external data processing device, and a video output unit. The first virtual machine performs video processing on input processing data. The second virtual machine transmits/receives the processing data to/from an outside. The switching unit switches an input destination of the processing data from the first virtual machine to the second virtual machine. The external data processing device receives the processing data transmitted from the second virtual machine, performs the video processing on the processing data, and transmits the processing data to the second virtual machine. The video output unit outputs, to a video output device, the processing data on which the video processing has been performed by the first virtual machine, and outputs, to the video output device, the processing data that the second virtual machine has received.

11 Claims, 4 Drawing Sheets

(51) Int. Cl.

| | | |
|---|---|---|
| *G06F 15/16* | (2006.01) | |
| *G06F 9/46* | (2006.01) | |
| *G06F 11/20* | (2006.01) | |
| *G06F 9/455* | (2006.01) | |
| *G06F 9/50* | (2006.01) | |
| *G06F 17/30* | (2006.01) | |
| *H04N 21/61* | (2011.01) | |
| *H04N 21/647* | (2011.01) | |
| *H04N 21/442* | (2011.01) | |

(52) U.S. Cl.
CPC ............ *G06F 9/5077* (2013.01); *G06F 11/20* (2013.01); *G06F 15/16* (2013.01); *G06F 17/30203* (2013.01); *H04N 21/442* (2013.01); *H04N 21/6125* (2013.01); *H04N 21/64723* (2013.01); *G06F 2009/4557* (2013.01); *G06F 2009/45591* (2013.01); *G06F 2009/45595* (2013.01)

(58) Field of Classification Search
CPC .... G06F 9/5077; G06F 17/30203; G06F 9/46; G06F 11/20; G06F 15/16; G06F 2009/4557; G06F 2009/45591; G06F 2009/45595
See application file for complete search history.

(56) References Cited

U.S. PATENT DOCUMENTS

| | | | | |
|---|---|---|---|---|
| 7,937,615 B2 * | 5/2011 | Takamoto | ............ | G06F 11/2025 714/1 |
| 8,595,737 B2 * | 11/2013 | Ichikawa | ............. | G06F 9/4856 710/5 |
| 8,656,018 B1 * | 2/2014 | Keagy | ....................... | G06F 8/63 709/220 |
| 8,694,991 B2 * | 4/2014 | Bonola | ..................... | G06F 8/61 718/1 |
| 8,892,919 B2 * | 11/2014 | Khodorkovsky | ......... | G06F 3/14 713/300 |
| 8,990,632 B2 * | 3/2015 | Baba | ................... | G06F 11/3006 714/44 |
| 9,519,656 B2 * | 12/2016 | Yin | ..................... | G06F 9/45558 |
| 9,560,393 B2 * | 1/2017 | Malone | .......... | H04N 21/234309 |
| 9,563,457 B2 * | 2/2017 | Lukacs | ................ | G06F 9/45558 |
| 2003/0036843 A1 | 2/2003 | Okude et al. | | |
| 2007/0180314 A1 * | 8/2007 | Kawashima | ........ | G06F 11/2023 714/15 |
| 2009/0006541 A1 | 1/2009 | Baba et al. | | |
| 2010/0115510 A1 * | 5/2010 | Ford | .................... | G06F 9/5077 718/1 |
| 2011/0239038 A1 * | 9/2011 | Ito | ........................ | G06F 11/1484 714/3 |
| 2013/0091376 A1 * | 4/2013 | Raspudic | ............ | G06F 11/1484 714/3 |
| 2014/0095927 A1 * | 4/2014 | Abraham | ................ | G06F 11/00 714/6.12 |
| 2015/0032806 A1 | 1/2015 | Baba et al. | | |
| 2015/0309817 A1 * | 10/2015 | Archer | ................ | H04L 67/1044 709/226 |
| 2016/0321149 A1 * | 11/2016 | Masuda | .................... | G06F 9/46 |

FOREIGN PATENT DOCUMENTS

| | | |
|---|---|---|
| JP | 2003-036174 A | 2/2003 |
| JP | 2006-244146 A | 9/2006 |
| JP | 2007-207219 A | 8/2007 |
| JP | 2009-116699 A | 5/2009 |
| JP | 2010-108036 A | 5/2010 |
| JP | 2011-128967 A | 6/2011 |
| JP | 2012-173969 A | 9/2012 |
| JP | 2014-059733 A | 4/2014 |
| WO | 2007/074797 A1 | 7/2007 |
| WO | 2011/074284 A1 | 6/2011 |

OTHER PUBLICATIONS

Jun. 9, 2015 Written Opinion issued in International Patent Application No. PCT/JP2015/059629.

Dec. 8, 2015 Office Action issued in Japanese Patent Application No. 2015-545571.

May 10, 2016 Decision to Grant issued in Japanese Patent Application No. 2015-545571.

* cited by examiner

ALTERNATE VIDEO PROCESSING ON BACKUP VIRTUAL MACHINE DUE TO DETECTED ABNORMALITIES ON PRIMARY VIRTUAL MACHINE

CROSS REFERENCE TO RELATED APPLICATIONS

This application is based upon and claims the benefit of priority from prior Japanese Patent Application No. 2014-088621, filed Apr. 22, 2014, the entire contents of which are incorporated herein by this reference.

This is a Continuation Application of PCT Application No. PCT/JP2015/059629, filed Mar. 27, 2015, which was not published under PCT Article 21(2) in English.

BACKGROUND OF THE INVENTION

Field of the Invention

The present invention relates to a processing method performed by a data processing system including a data processing device that processes data when an abnormality is detected in an operating system.

Description of the Related Art

As a prior art, a technology is disclosed in which hardware is virtualized, one processor causes a plurality of operating systems (hereinafter referred to as OSs) to operate, and a main OS is switched to another OS when the main OS has an abnormality (for example, Japanese Laid-Open Patent Publication No. 2012-173969,Japanese Laid-Open Patent Publication No. 2003-36174,and Japanese Laid-Open Patent Publication No. 2009-116699). In this technology, an OS that operates in case an abnormality occur in the main OS has been prepared. When the main OS goes down due to an abnormality or the like, another OS is started so as to perform a prescribed processing operation.

SUMMARY OF THE INVENTION

A data processing system in an aspect of the present invention includes: a many-core processor that includes a plurality of cores; a first virtual machine to which a prescribed number of cores of the plurality of cores are allocated, the first virtual machine performing video processing on processing data input; a second virtual machine to which cores different from those of the first virtual machine are allocated from among the plurality of cores, the second virtual machine transmitting/receiving the processing data to/from an outside via a network; a switching unit that switches an input destination of the processing data from the first virtual machine to the second virtual machine when an abnormality occurs in the first virtual machine; an external data processing device that receives the processing data transmitted from the second virtual machine, performs processing similar to the video processing performed by the first virtual machine on the processing data, and transmits the processing data to the second virtual machine; and a video output unit that outputs, to a video output device, the processing data on which the video processing has been performed by the first virtual machine when there is no abnormality in the first virtual machine, and that outputs, to the video output device, the processing data that the second virtual machine has received from the external data processing device when the abnormality occurs in the first virtual machine.

A data processing method in another aspect of the present invention is performed by a data processing system that includes a many-core processor including a plurality of cores. A first virtual machine to which a prescribed number of cores of the plurality of cores are allocated performs video processing on processing data input. A second virtual machine to which cores different from those of the first virtual machine are allocated transmits/receives the processing data to/from an outside via a network. An input destination of the processing data is switched from the first virtual machine to the second virtual machine when an abnormality occurs in the first virtual machine. An external data processing device receives the processing data transmitted from the second virtual machine, performs processing similar to the video processing performed by the first virtual machine on the processing data, and transmits the processing data to the second virtual machine. The processing data on which the video processing has been performed by the first virtual machine is output to a video output device when there is no abnormality in the first virtual machine. The processing data that the second virtual machine has received from the external data processing device is output to the video output device when the abnormality occurs in the first virtual machine.

BRIEF DESCRIPTION OF THE DRAWINGS

The present invention will be more apparent from the following detailed description when the accompanying drawings are referenced.

DESCRIPTION OF THE EMBODIMENTS

In a conventional system including a plurality of OSs, another OS needs to be installed onto the system in case a main OS have an abnormality. Therefore, a system configuration increases in size, and processing performance is wasted because the other OS does not operate at a normal time.

It is an object of the present invention to provide a technology in which, in a data processing system that processes data, data processing is continued by using an efficient configuration even when an abnormality is detected and resetting is performed.

An embodiment of the present invention is described below in detail with reference to the drawings.

Figure 1:
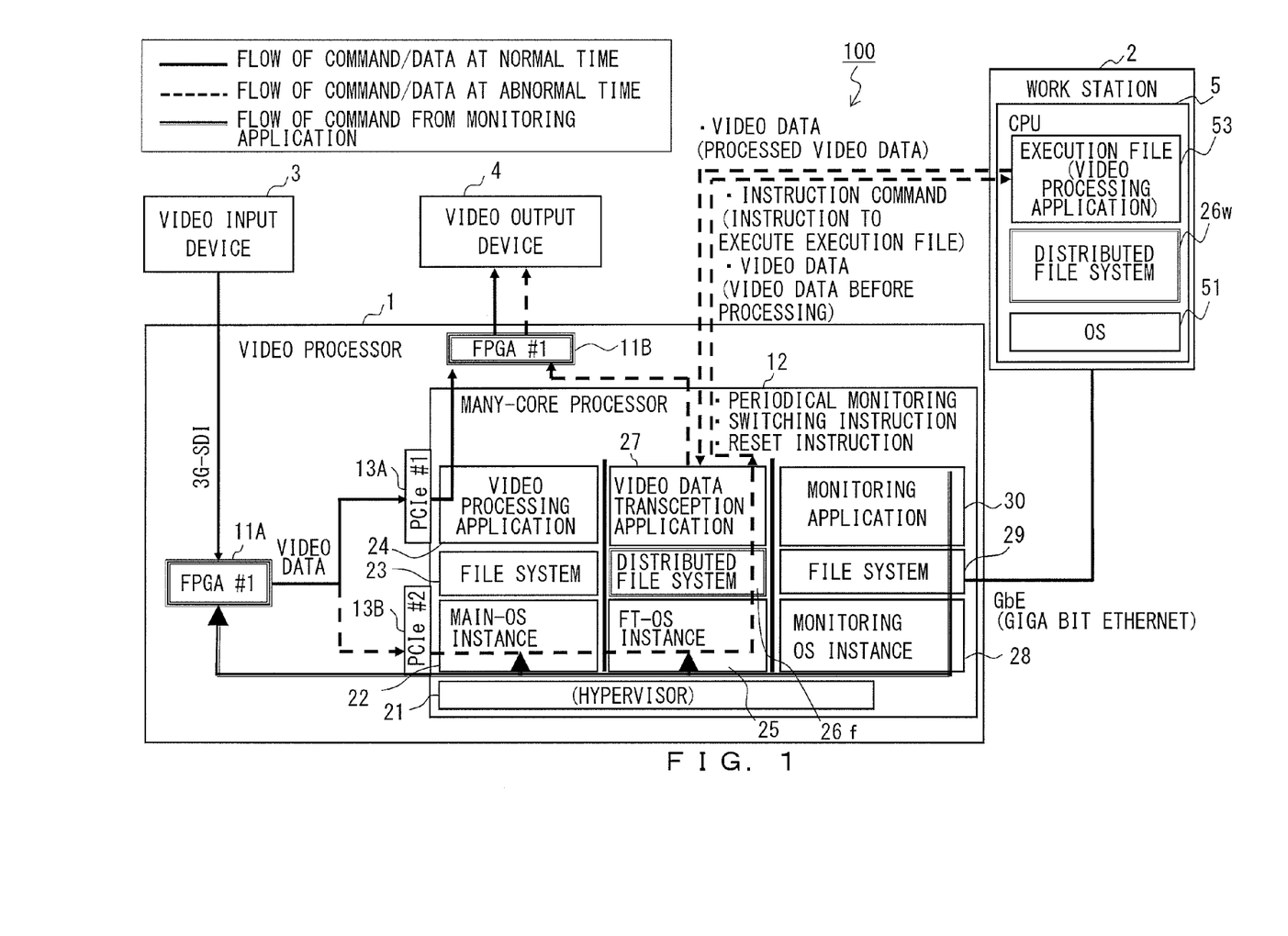
FIG. 1 illustrates the entire block configuration of a data processing system according to an embodiment.

FIG. 1 illustrates the entire block configuration of a data processing system according to the embodiment. A data processing system 100 illustrated in FIG. 1 includes a video processor 1, a video input device 3, a video output device 4, and a work station 2. FIG. 1 illustrates only devices configuring the data processing system 100 and the configurations of the respective devices that relate to a data processing method according to the embodiment.

The video input device 3 is a scope in this example. The video input device 3 captures an image by using a CCD (Charge Coupled Device) or a CMOS (Complementary MOS (Metal Oxide Semiconductor)) located at the tip so as to obtain video data, and outputs the obtained video data to the video processor 1.

The video processor 1 is an endoscope video processor in this example, and the video processor 1 is connected to the video input device 3 and the video output device 4 by wire or radio. The video processor 1 performs necessary video processing on the video data input from the video input device 3, and outputs the obtained processed video data to the video output device 4.

The video output device 4 is a monitor in this example, and the video output device 4 displays a video according to the processed video data that has been input from the video processor 1.

As described above, the data processing system 100 is an endoscope system in this example. In the endoscope system, the video processor 1 performs necessary processing on the video data obtained by the video input device 3 such as a scope, and outputs the processed video data to the video output device 4 such as a monitor 4. The video output device 4 outputs video according to the video data received from the video processor 1.

The video processor 1 illustrated in FIG. 1 includes a many-core processor 12, integrated circuits (in FIG. 1, FPGAs (Field-Programmable Gate Arrays) #1) 11A and 11B, and an interface 13.

The FPGA #1 (11A) receives video data that has been transmitted from the video input device 3 according to the 3G-SDI standard, and outputs the video data on which pre-stage processing has been performed to the many-core processor 12. The video data output from the FPGA 11A is input to the many-core processor 12 according to the state of the many-core processor 12. At this time, the video data is input to the many-core processor 12 via either a PCIe (Peripheral Component Interconnect express) #1 (13A) that is a first interface or a PCIe #2 (13B) that is a second interface. The FPGA #1 (11B) performs post-stage processing on the video data output from the many-core processor 12, and transmits the video data to the video output device 4.

In FIG. 1, a configuration to perform pre-stage processing on the video data input from the video input device is denoted by the reference numeral "11A" in order to illustrate an input/output relationship with the video input device 3 or the video output device 4. A configuration to perform post-stage processing on the video data that the many-core processor 12 has performed necessary processing on is denoted by the reference numeral "11B".

The many-core processor 12 performs necessary processing on the video data input via the PCIe #1 (13A) or the PCIe #2 (13B), and outputs the processed video data to the FPGA 41 (11B). The many-core processor 12 includes a large number of processor cores, and executes a hypervisor 21. The hypervisor 21 causes virtual machines for a normal time, for an abnormal time, and for monitoring to operate.

The virtual machine for a normal time implements a main OS instance 22, a file system 23, and a video processing application 24 by using a prescribed core of the large number of processor cores included in the many-core processor 12. The virtual machine for a normal time causes the video processing application 24 operating on the main OS instance 22 to perform necessary processing on the video data input via the PCIe #1 (13A) by using the file system 23 at a normal time, namely, when the main OS is normally operating. The video processing application 24 transmits the video data on which necessary processing has been performed to the video output device 4 via the FPGA #1 (11B).

The virtual machine for an abnormal time uses a core that is different from the core used by the virtual machine for a normal time from among the large number of processor cores included in the many-core processor 12. The virtual machine for an abnormal time implements an OS instance for an abnormal time (an FT (Fault Tolerant)-OS instance) 25, a distributed file system 26*f*, and a video data transception application 27. The virtual machine for an abnormal time causes the video data transception application 27 operating on the FT-OS instance 25 to process video data by using a distributed cluster at an abnormal time, namely, while the main OS is performing reset processing after an abnormality has been detected in the main OS. In this example, the video data transception application 27 transfers the video data to the work station 2 that is a device outside the video processor 1, as illustrated in FIG. 1. Upon receipt of the processed video data from the work station 2, the video data transception application 27 transmits the processed video data to the video output device 4 via the FPGA #1 (11B). The virtual machine for an abnormal time and the work station 1 share the distributed file system 26.

The reset processing of the main OS is performed by using a known technology for resetting and restarting an OS.

The virtual machine for monitoring implements a monitoring OS instance 28, a file system 29, and a monitoring application 30. The monitoring application 30 operating on the monitoring OS instance 28 periodically monitors the main OS instance 22. When the monitoring application 30 detects an abnormality in the main OS instance 22, the monitoring application 30 transmits commands to the main OS instance 22 and the FPGA #1 (11A) in such a way that the main OS instance 22 resets the main OS and that the FPGA #1 (11A) switches output destinations. When the monitoring application 30 recognizes that the man OS has been restored, the virtual machine for monitoring performs switching processing in such a way that the virtual machine for a normal time processes video data. The specific content of the switching processing above will be described later in detail with reference to FIGS. 3A and 3B.

The work station 2 is an information processing device outside the video processor 1, and the work station 2 is mutually connected to the video processor 1 via a gigabit Ethernet (GbE, Ethernet is a registered trademark) or the like. As described above, on the data processing system 100, the video processor 1 configures a main cluster, whereas the work station 2 configures a distributed cluster. A CPU 5 in the work station 2 implements an OS 51, a distributed file system 26*w*, and an execution file 53. The CPU 5 executes the execution file 53 according to a command to execute the execution file 53 from the video processor 1 so as to start processing described in the execution file 53.

In this example, the execution file 53 includes a program of a video processing application. The video processing application included in the execution file 53 performs processing similar to the processing of the video processing application 24 operating on the main OS instance 22. In an abnormal time, namely, while the main OS is performing reset processing, the video processing application 24 operating on the main OS instance 22 cannot operate. During this period, the video processing application of the execution file 53, instead of the video processing application 24 of the video processor 1, performs video processing. The work station 2 transfers, to the video processor 1, the processed video data obtained from the video processing application of the execution file 53. As a result of processing on video data performed by the distributed cluster, even when the main OS has been reset, video data is transmitted from the many-core processor 12 via the FPGA #1 (11B) to the video output device 4, similarly to the processing performed by the video processing application 24 of the virtual machine for a normal time.

As described above, in the data processing system 100 according to the embodiment, a plurality of OS instances (in the exemplary configuration illustrated in FIG. 1, two OS instances) are implemented by the hypervisor 21. The data processing system 100 includes the hypervisor 21 operating on the video processor 1 that is a main cluster, and the main OS instance 22 for a normal time and the FT-OS instance 25 for an abnormal time operate on the hypervisor 21. The data processing system 100 includes the distributed file system 26 (in FIGS. 1, 26f and 26w) that the FT-OS instance 25 for an abnormal time and the work station 2 that is a distributed cluster can commonly access. The FT-OS instance 25 is configured so as to be able to execute a processing program in the distributed file system 26w on the distributed cluster via the distributed file system 26f provided on the FT-OS instance 25. While reset processing is being performed after an abnormality has been detected in the main OS instance 22, the FT-OS instance 25 uses the distributed file system 26 (26f and 26w) so as to continue video processing in the work station 2.

Data processing methods at a normal time and at an abnormal time performed by the data processing system 100 according to the embodiment are described next in detail with reference to sequence diagrams.

Figure 2:
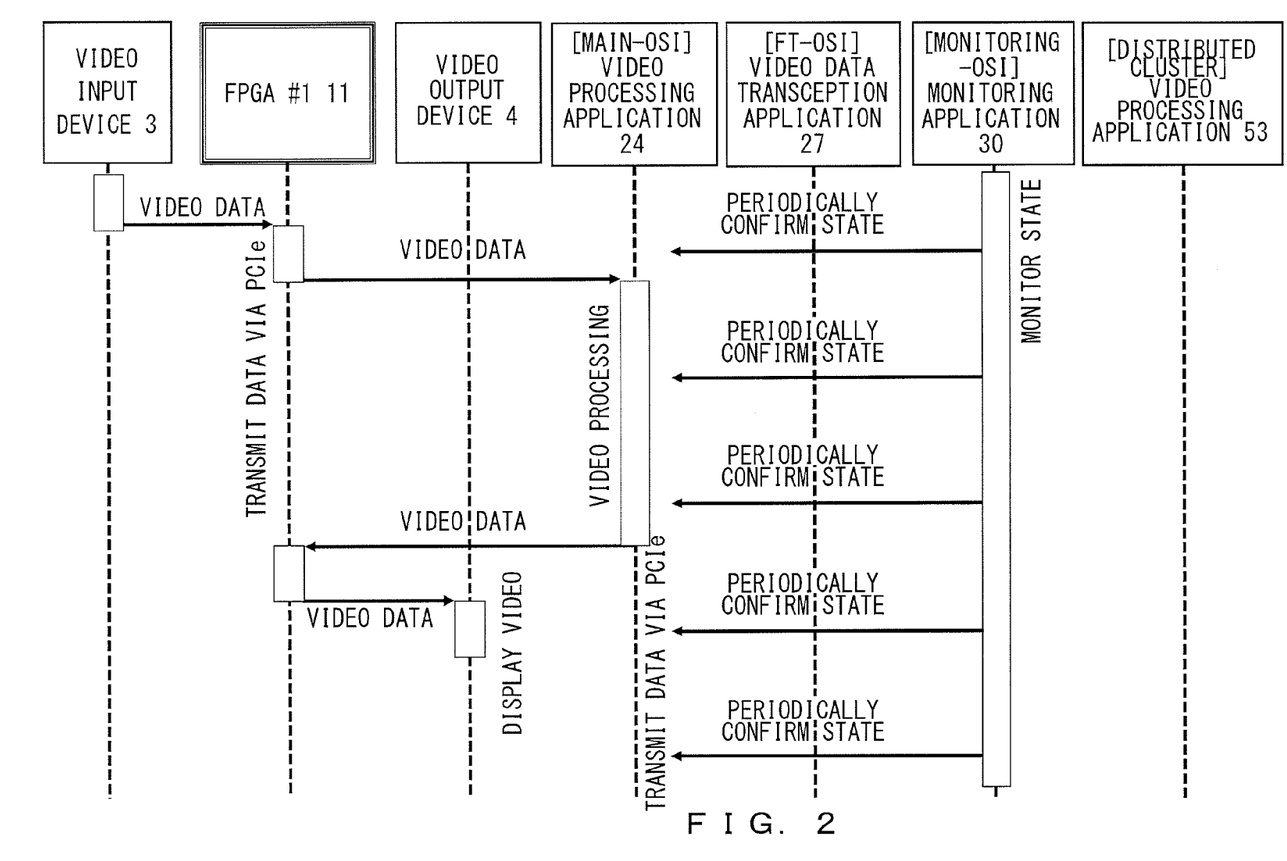
FIG. 2 illustrates a sequence for processing video data during the normal operation of a main OS in a data processing system according to an embodiment.

FIG. 2 illustrates a sequence for processing video data during the normal operation of the main OS in the data processing system 100 according to the embodiment. An operation of the data processing system 100 at a normal time is described first with reference to FIG. 2.

As illustrated in FIG. 2, upon receipt of video data transmitted from the video input device 3, the FPGA #1 (11A) transfers the video data to the virtual machine for a normal time via the PCIe #1 (13A) of FIG. 1. The virtual machine for a normal time performs necessary processing on the received video data. Specifically, as described above, the video processing application 24 operating on the main OS instance 22 performs necessary processing by using the file system 23, and outputs the processed video data to the FPGA #1 (11B) via the PCIe #1 (13A). Consequently, the video processing application 24 operating on the main OS instance 22 of the many-core processor 12 transmits the processed video data to the video output device 4 via the FPGA #1 (11B). The video output device 4 outputs video according to the received video data. In FIG. 2, the FPGA #1 (11A) on the side of the video input device 3 and the FPGA #1 (11B) on the side of the video output device 4 are illustrated as a common object, for simplification.

The monitoring application 30 operating on the monitoring OS instance 28 of the virtual machine for monitoring periodically monitors the state of the main OS. As illustrated in FIG. 2, while no abnormality is detected in the main OS (at a normal time), the video processing application 24 operating on the main OS instance 22 of the video processor 1 sequentially processes video data input from the video input device 3. As described above, while no abnormality is detected in the main OS, the video processing application 24 operating on the main OS instance 22 of the video processor 1 continues processing of outputting the processed video data to the video output device 4.

Figure 3A:
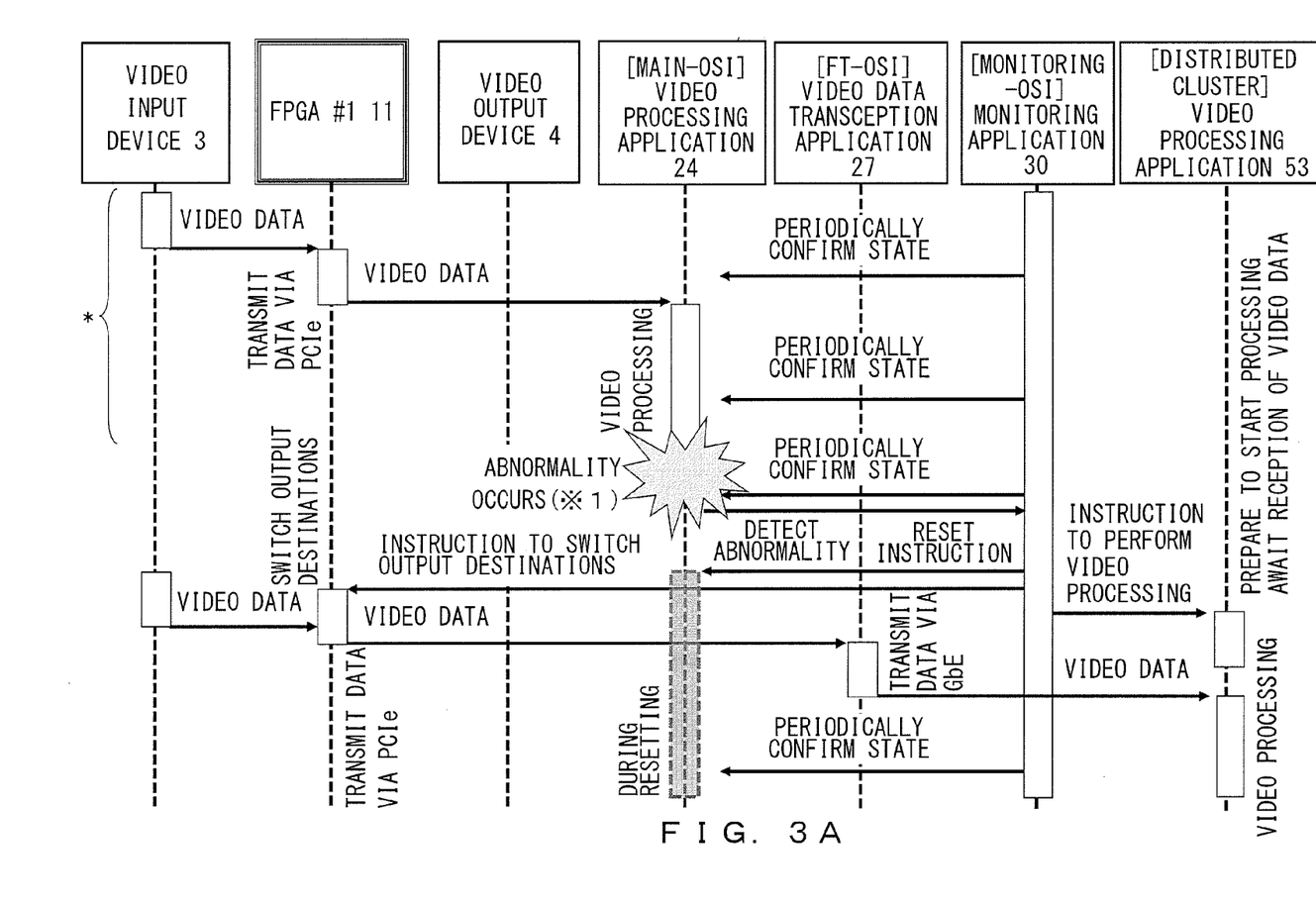
FIG. 3A illustrates a sequence (no. 1) for processing video data when an abnormality has been detected in a main OS in a data processing system according to an embodiment.
Figure 3B:
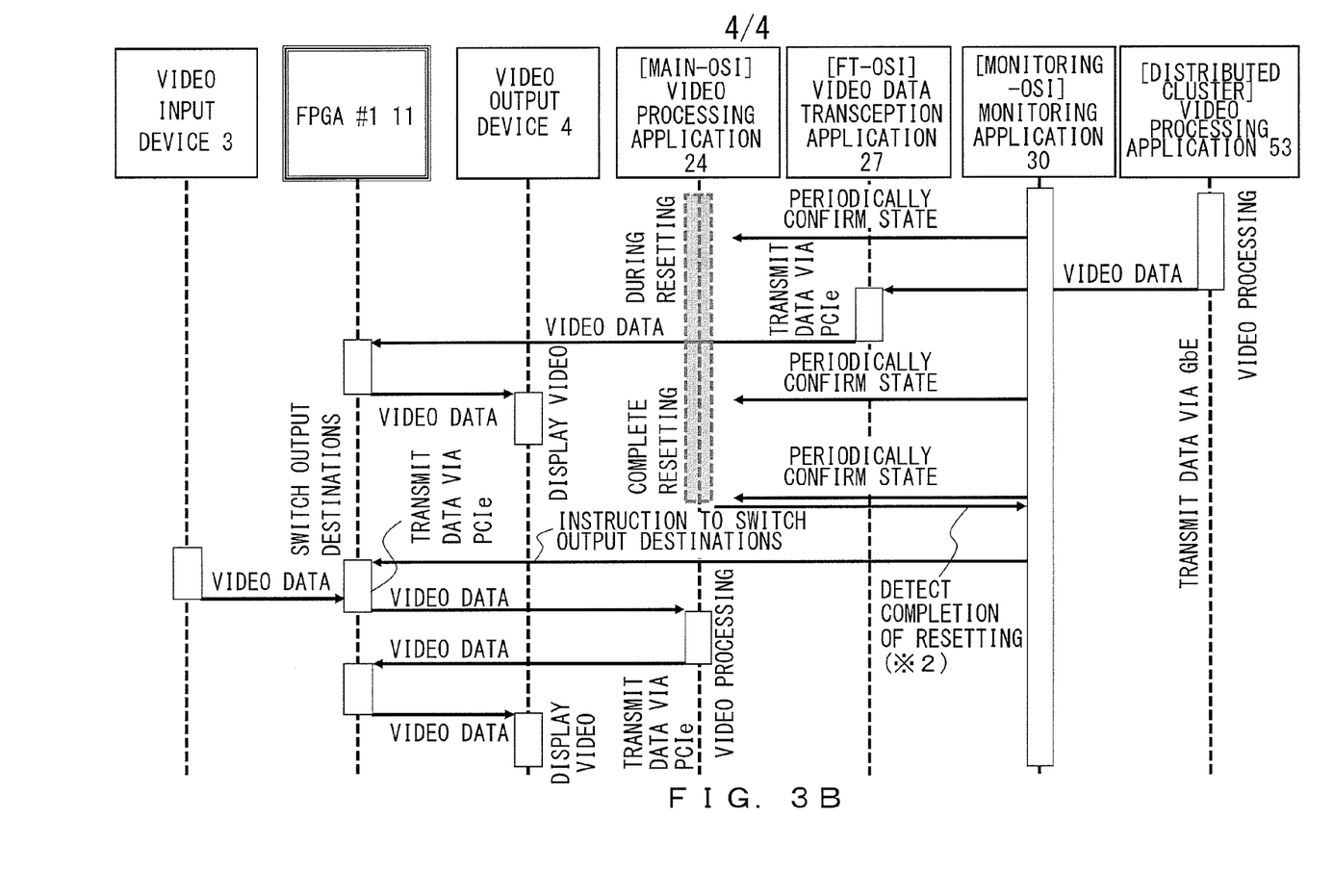
FIG. 3B illustrates a sequence (no. 2) for processing video data when an abnormality has been detected in a main OS in a data processing system according to an embodiment.

FIGS. 3A and 3B illustrate sequences for processing video data when an abnormality has been detected in the main OS in the data processing system 100 according to the embodiment. FIG. 3A illustrates a sequence of processing in which, when the virtual machine for a normal time (the main OS) is processing video data, an abnormality is detected in the main OS, and the main OS starts to be reset. FIG. 3B illustrates a sequence of processing after the main OS has been restored as a result of reset processing. An operation of the data processing system 100 at an abnormal time is described next with reference to FIGS. 3A and 3B.

First, in (*) of FIG. 3A, processing similar to the processing in FIG. 2 is performed. Namely, the video processing application 24 on the main OS instance 22 processes video data input from the video input device 3 via the FPGA #1 (11A), and outputs the processed video data to the video output device 4 via the FPGA #1 (11B).

Assume that, when the monitoring application 30 operating on the monitoring OS instance 28 periodically monitors the main OS, an abnormality occurs in the main OS, and the monitoring application 30 detects the abnormality ((*1) in FIG. 3A). The monitoring application 30 issues a command to perform reset processing to the main OS instance 22. The monitoring application 30 also issues, to the FPGA #1 (11A), a command to switch output destinations. The monitoring application 30 issues a command to execute an execution file, namely, a command to cause the video processing application 53 to perform video processing, to the distributed cluster (in FIG. 1, the work station 2).

Upon receipt of the command to perform reset processing from the monitoring application 30, the main OS instance 22 performs reset processing according to the command. Upon receipt of the command to switch output destinations from the monitoring application 30, the FPGA #1 (11A) switches an output destination to an interface indicated by the command. As illustrated in FIG. 3A, when an abnormality has been detected in the main OS instance 22, the FPGA #1 (11A) switches an output destination from the PCIe #1 (13A) to the PCIe #2 (13B).

When there are two output destinations of the FPGA #1 (11A), as in the configuration illustrated in FIG. 1, a current output destination may be switched to the other output destination in accordance with a switching command.

When video data is input from the PCIe #2 (13B) that is the second interface, the FT-OS instance 25 detects an input of the video data. When the input of the video data is detected, the video data transception application 27 operating on the FT-OS instance 25 starts communication with the work station 2, and processes the input video data by using the distributed cluster.

Specifically, the video data transception application 27 transfers the input video data to the distributed cluster via GbE. Upon receipt of a command to perform video processing from the monitoring application 30, the video processing application 53 on the work station 2 that is a distributed cluster performs preparatory processing to start processing, and awaits reception of the video data. Upon receipt of the video data from the video data transception application 27, the video processing application 53 starts to perform video processing on the received video data. The video processing application 53 of the distributed cluster transfers the processed video data to the video data transception application 27, and the video data transception application 27 outputs the processed video data to the video output device 4 via the PCIe #2 (13B) and the FPGA #1 (11B).

A sequence after the main OS has been restored is illustrated in FIG. 3B.

As illustrated in FIGS. 3A and 3B, the monitoring application 30 continues to periodically monitor the state of the main OS while the main OS is performing resetting. Upon receipt of a report indicating that resetting of the main OS has been completed from the side of the main OS instance 22 ((*2) in FIG. 3B), the monitoring application 30 issues, to respective units, a command to return processing from alternative video processing performed in the distributed cluster to video processing on the main OS instance 22.

Specifically, the monitoring application 30 issues, to the FPGA #1 (11A), a command to switch output destinations. The FPGA #1 (11A) switches an output destination from the PCIe #2 (13B) to the PCIe #1 (13A) in accordance with the command received from the monitoring application 30. When the FPGA #1 (11A) has completed to switch output destinations, the video data input from the video input device 3 to the video processor 1 is transmitted to the video processing application 24 operating on the main OS via the PCIe #1 (13A). When resetting of the main OS has been completed such that the main OS normally operates again, the video processing application 24 operating on the main OS instance 22 performs a video processing operation. Processing operations of respective units after the main OS restarts a normal operation are as described above with reference to FIG. 2.

As described above, in the data processing system 100 according to the embodiment, the following control is performed. The video processor 1 configures a main cluster, and when the video processor 1 detects an abnormality in the main OS instance 22, the FT-OS instance 25 transfers video data to be processed to the work station 2 that is a distributed cluster while the main OS instance 22 is performing reset processing. The work station 2 includes the execution file 53 that includes a video processing program for performing processing similar to the processing of the video processing application 24 operating on the main OS instance 22. By executing the video processing program of the execution file 53 on the work station 2, even when the main OS instance 22 is performing resetting, video data can continue to be processed, and video can continue to be output to the video output device 4. By configuring the work station 2 that is an external device so as to continue to process video data when the main OS instance 22 for a normal time has an abnormality, an OS instance that processes video data at an abnormal time does not need to be included in the video processor 1. Consequently, video data can continue to be processed, and video can continue to be output to the video output device 4 in a state in which a wasteful configuration in the video processor 1 is eliminated. Accordingly, in the data processing system 100, even when an abnormality is detected and resetting is performed, data can continue to be processed in an efficient configuration.

A configuration in which two virtual machines to process video data have been prepared, namely, a configuration in which one FT-OS instance 25 has been prepared for the main OS instance 22 for a normal time, has been described above as an example. However, the present invention is not limited to this. As an example, three or more virtual machines may be included. In this case, two or more FT-OS instances may be prepared for an abnormal time.

The FT-OS instance may operate only while the main OS has been reset (at an abnormal time) so as to perform video processing instead of the main OS, as described above. Alternatively, the FT-OS instance may perform, for example, a processing operation other than the video processing while the main OS is normally operating (at a normal time). While the main OS cannot perform video processing, an FT-OS instance can be utilized efficiently while suppressing influence on an output of video to the video output device 4.

In the description above, during resetting of the main OS, only an operation of the video processing application 24 from among various applications operating on the main OS instance 22 is performed by the FT-OS instance 25 and the distributed cluster (the work station 2) instead of the video processing application 24. As described above, not all of the applications operating on the main OS instance 22 continue processing in the distributed cluster, and only processing that it is desirable that be not interrupted even during resetting of the main OS is continued. Consequently, a load on the FT-OS instance 25 is prevented from increasing excessively, a user of the data processing system 100 can continue to observe video, and the influence of resetting of the main OS on a user is minimized.

Further, as illustrated in FIG. 1, the data processing system 100 according to the embodiment employs the many-core processor 12. The many-core processor 12 includes a large number of cores in one processor, and therefore multiple functions can be performed simultaneously in parallel. Accordingly, all or most of the functions needed in one data processing system can be performed by only one many-core processor 12.

In a conventional data processing system, if an abnormality occurs in one portion such as an FPGA or a CPU, other portions compensate for the portion in which the abnormality has occurred, and the portion in which the abnormality has occurred is reset and restarted during compensation such that a minimum level of processing is continued in the data processing system. If this method is employed in a data processing system installed with a many-core processor, when an abnormality occurs in one portion within the system, and the many-core processor is reset, the entirety or most portions of the system are reset, and there is a problem wherein it is difficult to continue even minimum necessary processing. In view of the problem above, in the above data processing method according to the embodiment, the work station 2 that is a device outside a device (the video processor 1) installed with the many-core processor 12 is used as a distributed cluster, and necessary processing is performed by the distributed cluster. Accordingly, as an example, a situation can be prevented in which the entirety or most portions of the data processing system are reset, and video processing cannot be continued such that an output of video to the video output device 4 is delayed.

The present invention is not limited to the embodiment above without change, and components can be deformed and embodied without departing from the scope of the embodiment. Various inventions can be implemented by appropriately combining a plurality of components disclosed in the embodiment above. As an example, all of the components disclosed in the embodiment may be combined appropriately. Further, components according to different embodiments may be combined appropriately. It can be understood that various deformations or applications can be made without departing from the spirit of the invention.

What is claimed is:
1. A data processing system comprising:
a multi-core processor that includes a plurality of cores;
a first virtual machine to which a prescribed number of cores of the plurality of cores are allocated, the first virtual machine performing video processing on processing data input;
a second virtual machine to which cores different from those of the first virtual machine are allocated from among the plurality of cores, the second virtual machine transmitting/receiving the processing data to/from an element outside the multi-core processor via a network;

a switching unit that switches an input destination of the processing data from the first virtual machine to the second virtual machine when an abnormality occurs in the first virtual machine;

an external data processing device that receives the processing data transmitted from the second virtual machine, performs processing similar to the video processing performed by the first virtual machine on the processing data, and transmits the processing data to the second virtual machine; and a video output unit that outputs, to a video output device, the processing data on which the video processing has been performed by the first virtual machine when there is no abnormality in the first virtual machine, and that outputs, to the video output device, the processing data that the second virtual machine has received from the external data processing device when the abnormality occurs in the first virtual machine.

2. The data processing system according to claim 1, wherein the first virtual machine is allocated cores other than the cores that have been allocated to the second virtual machine from among the plurality of cores.

3. The data processing system according to claim 1, further comprising:

a distributed file system that is shared with the external data processing device on the second virtual machine, the distributed file system performing control in such a way that the second virtual machine that has been switched as the input destination by the switching unit performs the video processing on the processing data on the external data processing device.

4. The data processing system according to claim 3, wherein the external data processing device is a distributed cluster, the distributed file system is configured of:
  a first distributed file system used on the second virtual machine; and
  a second distributed file system that is shared on the network, the second distributed file system being used on the distributed cluster, and
the second virtual machine switched by the switching unit performs control to perform the video processing on data to be processed on the distributed cluster by executing a video processing program in the second distributed file system via the first distributed file system.

5. The data processing system according to claim 1, further comprising:

an abnormality detecting unit that detects whether the first virtual machine has the abnormality; and a restoring unit that performs restoration processing on the first virtual machine when the abnormality detecting unit detects the abnormality of the first virtual machine, wherein when the restoring unit completes the restoration processing of the first virtual machine, the switching unit switches the input destination from the second virtual machine to the first virtual machine.

6. A data processing method performed by a data processing system that includes a multi-core processor including a plurality of cores, the data processing method comprising:

performing video processing on processing data input by a first virtual machine to which a prescribed number of cores of the plurality of cores are allocated;

transmitting/receiving the processing data to/from an element outside the multi-core processor via a network by a second virtual machine to which cores different from those of the first virtual machine are allocated;

switching an input destination of the processing data from the first virtual machine to the second virtual machine when an abnormality occurs in the first virtual machine;

receiving, by an external data processing device, the processing data transmitted from the second virtual machine, performing processing similar to the video processing performed by the first virtual machine on the processing data, and transmitting the processing data to the second virtual machine; and outputting, to a video output device, the processing data on which the video processing has been performed by the first virtual machine when there is no abnormality in the first virtual machine, and outputting, to the video output device, the processing data that the second virtual machine has received from the external data processing device when the abnormality occurs in the first virtual machine.

7. A data processing system comprising:

a multi-core processor having:
  a first plurality of cores being programmed to provide a first virtual machine that performs video processing on processing data input, and
  a second plurality of cores different from the first plurality of cores, the second plurality of cores being programmed to provide a second virtual machine that transmits/receives the processing data to/from an element outside the multi-core processor via a network;

a switch configured to change an input destination of the processing data from the first virtual machine to the second virtual machine in response an abnormality being present in the first virtual machine; and an external data processing apparatus configured to: receive the processing data transmitted from the second virtual machine, perform video processing on the processing data similar to the video processing performed by the first virtual machine, and transmit the processing data to the second virtual machine; wherein:

the multi-core processor outputs, to a video display, the processing data on which: (i) the video processing has been performed by the first virtual machine when there is no abnormality present in the first virtual machine, and (ii) the second virtual machine has received from the external data processing device when the abnormality is present in the first virtual machine.

8. The data processing system according to claim 7, wherein the first virtual machine is allocated cores other than the cores that have been allocated to the second virtual machine from cores available in the multi-core processor.

9. The data processing system according to claim 7, wherein:

the multi-core processor is programmed to:
  provide a distributed file system that is shared with the external data processing device on the second virtual machine, the distributed file system performing control such that the second virtual machine that has been switched as the input destination by the switch performs the video processing on the processing data on the external data processing device.

10. The data processing system according to claim 9, wherein:
the external data processing apparatus is a distributed cluster,
the distributed file system includes:
a first distributed file system provided on the second virtual machine; and
a second distributed file system that is shared on the network, the second distributed file system being provided on the distributed cluster, and
the second virtual machine switched by the switch performs control to perform the video processing on data to be processed on the distributed cluster by executing a video processing program in the second distributed file system via the first distributed file system.

11. The data processing system according to claim 7, wherein:
the multi-core processor is programmed to:
detect whether the abnormality is present in the first virtual machine; and
perform restoration processing on the first virtual machine when the abnormality is detected in the first virtual machine, wherein
when the multi-core processor completes the restoration processing of the first virtual machine, the switch switches the input destination from the second virtual machine to the first virtual machine.

* * * * *